Feb. 28, 1967  D. L. ALLEN  3,306,661
SAFETY RETAINING BELT FOR SHOPPING CARTS
Filed May 13, 1965  2 Sheets-Sheet 1

INVENTOR
DAVID L. ALLEN

BY *[signature]*
ATTORNEY

Feb. 28, 1967   D. L. ALLEN   3,306,661
SAFETY RETAINING BELT FOR SHOPPING CARTS
Filed May 13, 1965   2 Sheets-Sheet 2
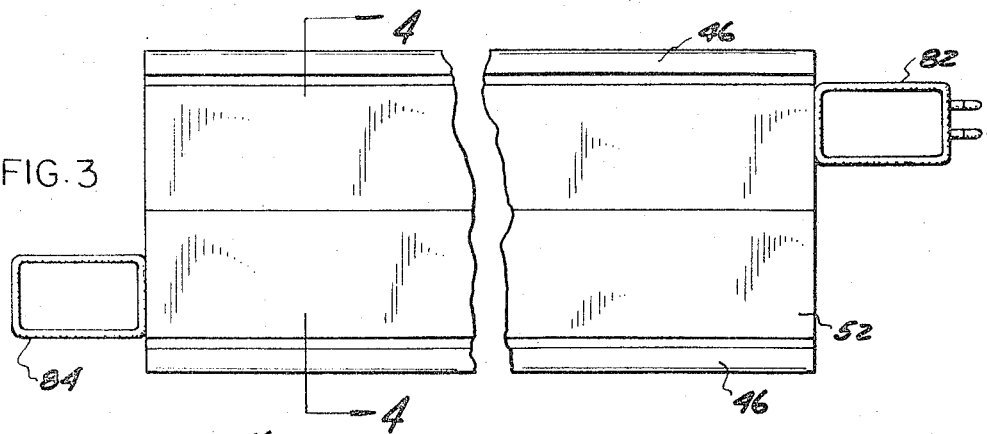
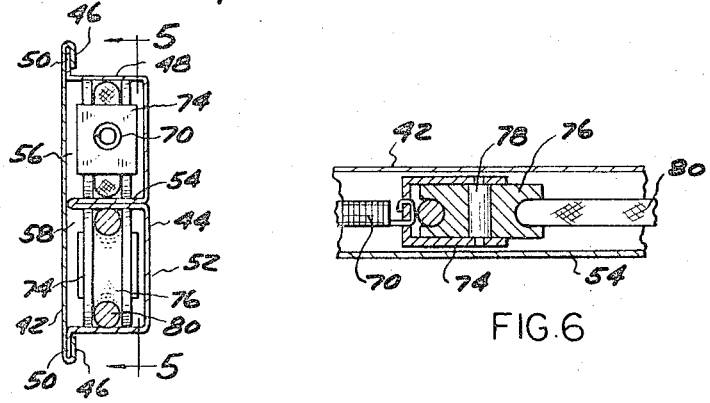
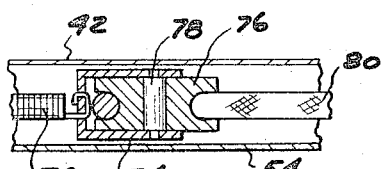
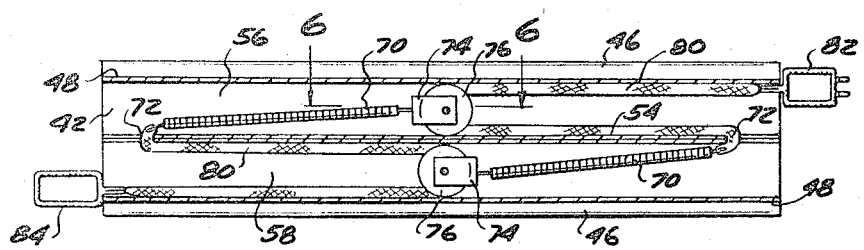
INVENTOR
DAVID L. ALLEN.
BY
ATTORNEY United States Patent Office 3,306,661
Patented Feb. 28, 1967

3,306,661
SAFETY RETAINING BELT FOR
SHOPPING CARTS
David L. Allen, Livonia, Mich., assignor to Able Building Company, Livonia, Mich.
Filed May 13, 1965, Ser. No. 455,537
4 Claims. (Cl. 297—385)

This invention relates to shopping carts of the type employed by patrons of markets to collect and transport a selection of goods, and more particularly to a safety belt useful for retaining children securely in the seats provided for them in such shopping carts.

An increasingly large percentage of the shopping carts used in supermarkets and other places, are designed to provide a seat for infants or small children who accompany shoppers. These seats normally consist of a back rest and a horizontal seat member located adjacent to the top side of the upper basket of the shopping cart, adjacent to the handle, and a pair of apertures formed in the back of the basket which allow the child's legs to extend outwardly from the basket. Shopping carts incorporating such seats are very popular as those customers accompanied by small children find them a convenient way to transport a child and maintain him in a controllable position, and the customers who are not accompanied by children can use the seat compartment for the retention of small or fragile articles.

A problem is created in the use of such carts because the more mobile children often attempt to crawl out of the seats and thereby place themselves in a dangerous position with respect to both their persons and the merchandise displays in the market. The present invention therefore contemplates a safety retaining belt intended to be incorporated in shopping carts of the type having children's seats for the purpose of securely but gently retaining the child in the seat and preventing him from accidentally or intentionally leaving the seat. In order for such a seat belt to be commercially successful it must be low in cost, easy to install in new or existing carts, simple to operate, and unobtrusive when not in use. The present invention contemplates such a belt which meets all of these requirements.

As disclosed in the following detailed description of a preferred embodiment of the invention, the belt is of the self-retracting type so as to assume a compact and relatively neat position when not in use, and to automatically adjust to the size of a wide range of occupants when in use. The preferred embodiment of the belt is housed in an elongated channel member which is adapted to be secured in a horizontal position to the forward side of the basket member which serves as a back rest for the child. The forward side is the side opposite to that which the child's back rests against. The ends of the channel member are located adjacent to the sides of the back member and the two ends of the belt are adapted to be easily withdrawn from the two ends of the channel, brought around the front of the back rest and the child, and buckled together to retain the child in the seat. The mechanism within the channel exerts a gentle pressure on the belt ends so that the belt conforms to the size of the occupant. When the buckle is released the ends are automatically retracted within the channel. The mechanism within the channel consists of a pair of pulley members which are supported for longitudinal movement along the channel and are biased toward an end of the channel by elongated springs which have one end fixed to the channel and the other end fixed to the pulley. The channel is divided longitudinally into an upper and lower section and one of the pulleys is operative to move in each of these sections. One of the pulleys is biased by its spring towards the position at one end of the channel and the other pulley is biased toward a position at the other end. The belt halves each have their end within the channel anchored to the channel and are looped about the pulleys and then brought out of the channel. Each of the springs urges its pulley to a position wherein the belt is retracted with only its buckle end extending from the channel. When the belt end is pulled the pulley is moved by the belt along the length of the channel, against its spring, through a distance equal to half of the outward motion of the belt from the channel. When the belt end is released the spring pulls the belt back into the channel by exerting a force on the pulley. This arrangement is low in cost, simple in construction, and highly reliable in operation.

It is therefore seen to be the primary object of the present invention to provide a safety retaining belt for children's seats in shopping carts of the type employing a housing on the forward side of the back rest of the seat, which carries the belt in a retracted position when not in use and which allows the belt ends to be withdrawn from the rear side of the seat into an operating position.

Another object is to provide such a belt wherein the belt is retracted by a pulley mechanism which moves longitudinally in a retaining member and has a motion of only half the distance that the belt is extended.

Another object is to provide such a seat belt wherein the housing may be easily attached to existing shopping carts.

Other objects, advantages, and applications of the present invention will be made apparent by the following detailed description of a preferred embodiment of the invention. The description refers to the accompanying drawings in which:

FIGURE 3 is a front view of the seat belt retaining mechanism with the center broken away for purpose of illustration;

FIGURE 4 is a transverse sectional view through the seat belt mechanism taken along line 4—4 of FIGURE 3;

FIGURE 5 is a longitudinal sectional view through the seat belt mechanism taken along line 5—5 of FIGURE 4; and FIGURE 6 is a partial sectional view through one of the pulleys, taken along line 6—6 of FIGURE 5.

Figure 1:
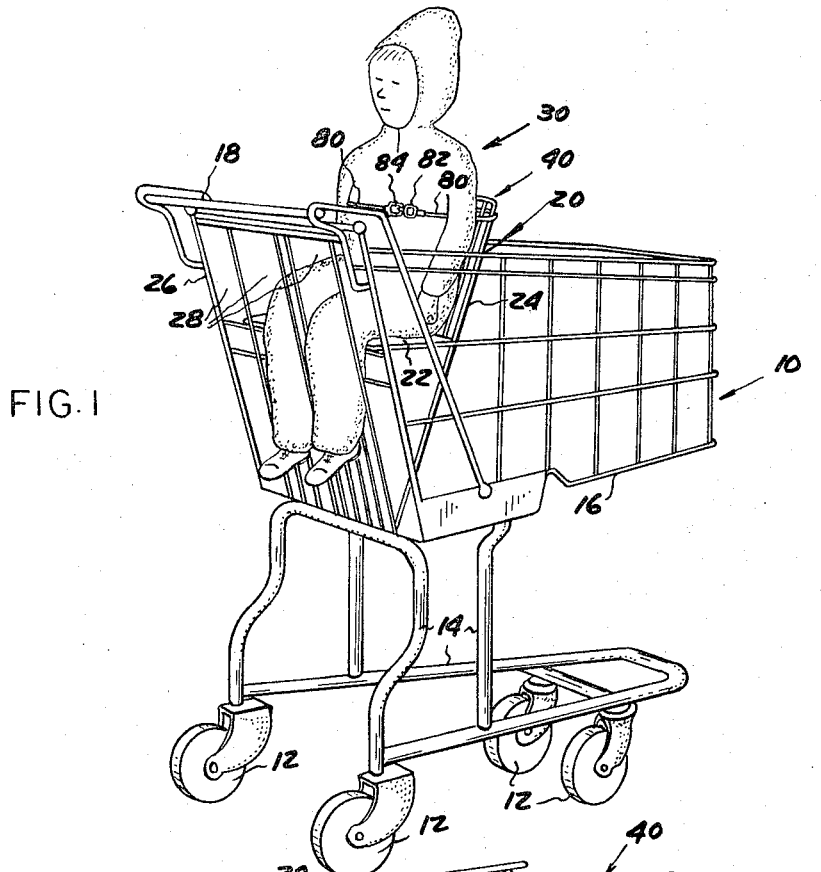
FIGURE 1 is a perspective view of a shopping cart having a child's seat, occupied by a child who is retained in the seat by a belt of the present invention.

Referring to the drawings, the preferred embodiment of the invention is applied to a shopping cart generally indicated at 10. The cart broadly consists of caster type wheels 12, a basket supporting structure 14, a basket proper 16, and a handle mechanism 18. Included at the upper side of the basket, adjacent to the handle structure 18, is a child's seat, generally indicated at 20.

Figure 2:
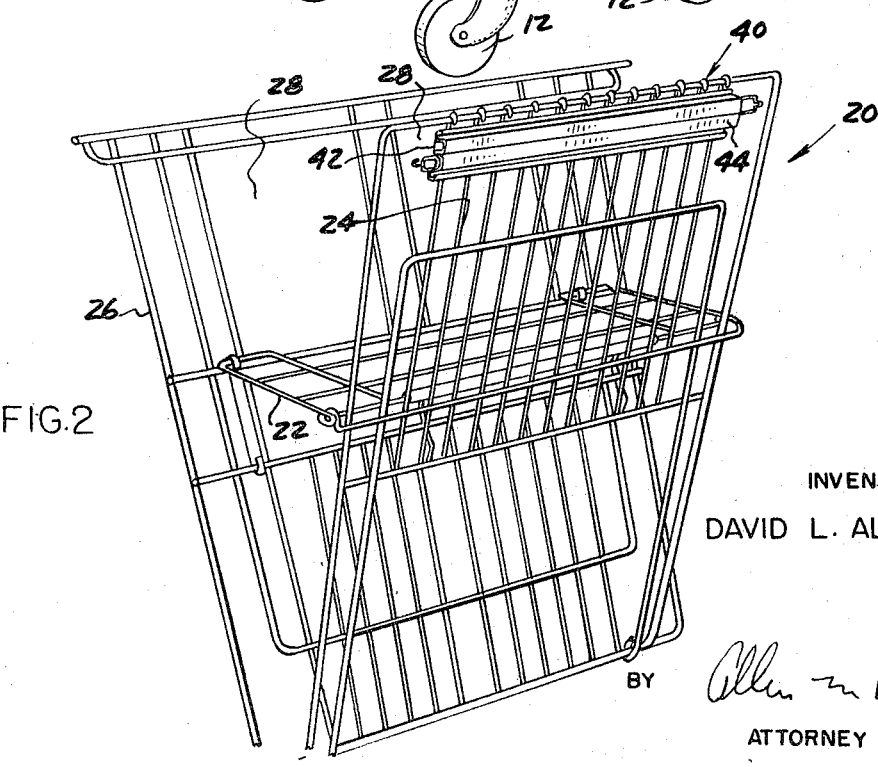
FIGURE 2 is a detailed view of the child's seat section of the cart showing the preferred embodiment of the seat belt in a retracted position.

As detailed in FIGURE 2, the child's seat section 20 of the shopping cart 10 broadly consists of a horizontal seat member 22, a back rest member 24 which extends upwardly from what will be termed the forward side of the seat member and is slightly inclined with respect to the vertical in the forward direction, and the back 26 of the cart. Each of these members, and the cart basket proper 16, is formed of spaced wire members. The particular configuration of the seat and the structure of the members is not of importance to the present invention and will not be detailed in this description. It should be recognized that in its broader aspects the present invention is applicable to use with any form of seat member, including those not employed in shopping carts, but has particular merit when used in its narrower sense, in combination with the seat of a shopping cart.

The rear member 26 of the basket 16, has a pair of spaces 28 formed directly forward of the seat. These spaces are adapted to pass the legs of a child occupying the seat. As shown in FIGURE 1, a child, generally indicated at 30, sits on the horizontal member 22 with his back resting on the vertically inclined member 24 and his legs passing through the apertures 28 in the forward member 26. The broad purpose of the present invention, as has been noted, is to restrain the child in this position and prevent him from either accidentally or intentionally leaving the position without first having the safety belt undone, either by the child or by an accompanying adult.

The belt assembly, generally indicated at 40, is housed within a casing formed on a flat elongated base 42 and a channel-shaped cover member 44. The long edges of the base are bent to form inwardly turned flanges 46 which are spaced from the base by a distance approximately equal to the thickness of the material employed. This material might be sheet or extruded metal or plastic, or other suitable material. The cover member 44 has a length equalling that of the base 42 and includes a pair of side members 48 which have outwardly turned flanges 50 that fit within the flanges 46 of the base member.

An outre cover surface 52 is spaced from the base 42 by the side members 48 so as to form a compartment therebetween. The cover member 44 has a central extending section 54 which projects from the cover surface 52 to the base 42 and extends longitudinally the length of the unit to effectively divide the interior space into an upper compartment 56 and a lower compartment 58. The compartments 56 and 58 are identical, except for their position and the entire mechanism is symmetrical about the center partition 54. The components in the two compartments will be given identical numbers.

Each compartment contains an elongated spring 70 which has one end anchored to a slot 72 formed in the partition 54. The two slots 72 are formed adjacent to the two ends of the partition. The other end of each spring is connected to one of two pulley blocks 74. As shown in FIGURE 6, each block is U-shaped and rotatably supports a pulley 76 therein on a pin 78.

A pair of nylon cords 80 which form the belts of the present invention, each have one end fixed to one of the slots 72 in the partition 54. The cord 80 which forms the belt of the upper section 56 has its end retained in the same aperture 72 in the divider 54 to which the spring 70 in the lower compartment 58 is fixed. Likewise, the cord 80 which forms the belt in the lower section 58 is fixed to the same aperture 72 as the spring 70 in the upper section 56. The cords are each passed over the pulleys 76 in their respective sections and passed out of the end of the assembly 40. In this way the springs 70 acting on the pulleys 76 tend to retract the outer ends of the belts back into the assembly.

One of the belt cords 80 has a male buckle member 82 fixed thereon and the other cord member has a female buckle member 84 fixed thereon. The exact nature of the buckle members is not important, and in the preferred embodiment a simple type of buckle such as is found on children's car seats is employed. The male buckle member simply attaches to the female buckle member and is locked therein until removed.

FIGURE 1 illustrates the manner in which the belt cords are drawn out of the apparatus 40 by pulling on the buckle members 82 and 84 and joining them around a child 30. As the buckle members are withdrawn the cords act on the pulleys to extend the spring 70. The pulleys move along the sections 56 and 58 in the direction in which their cords 80 are withdrawn. When the buckle members 82 and 84 are released, the spring 70 retracts the pulleys and the cord members into the assembly 40.

The assembly 40 attached to the forward side of the back rest member 24 in any suitable manner such as welding it to the wires of the back rest. It might also be installed through the use of nuts and bolts or other common fasteners.

It is thus seen that the present invention provides a simple, low cost device for retaining the occupants in child's seats of shopping carts, which is easy to install and which is unobtrusive when not in use.

Having thus described my invention, I claim:

1. A retractable seat belt assembly, comprising: an elongated housing; a pair of belt members each having one end fixed with respect to the housing and the other end freely extendable out of the housing; a pair of elongated spring members each having one end fixed within said housing; a pair of rotatable pulley members each attached to the other end of each of said spring members, each of said belt members being passed over one of said pulley members so that the pulley member tends to draw the free end of the belt member into the housing under the pull of the spring connected to that pulley member; and buckle means disposed at the free ends of the belt members and operative to be passed over an occupant of the seat and attached to one another; wherein the elongated housing is divided longitudinally into an upper compartment and a lower compartment and one of said belt members, spring members and pulley members are disposed in each compartment.

2. The assembly of claim 1 wherein the elongated housing is fixed to the side of the seat back rest opposite to that against which the occupant's back rests, with its ends disposed adjacent to the two opposite sides of the back rest so that the free ends of the belt may be brought around the sides of the back-rest and joined together on the side of the back-rest which is used by the occupant.

3. The assembly of claim 1 wherein the spring member disposed in the upper compartment is fixed to the same point in the housing as the belt member disposed in the lower compartment, and the spring member disposed in the lower compartment is fixed to the same point in the housing as the belt member disposed in the upper compartment.

4. The assembly of claim 1 wherein the ends of the elongated housing are disposed adjacent to the sides of the back-rest member.

References Cited by the Examiner

UNITED STATES PATENTS

| 2,468,560 | 4/1949 | Kirkpatrick | 28—150 |
| 2,798,539 | 7/1957 | Johnson | 280—150 |
| 3,107,121 | 10/1963 | Mougey | 297—388 |
| 3,116,092 | 12/1963 | Spranger | 297—388 |
| 3,222,107 | 12/1965 | Ferrara | 297—388 |

FOREIGN PATENTS 527,212  7/1956  Canada.

FRANK B. SHERRY, *Primary Examiner.*

JAMES T. McCALL, *Examiner.*